A. D. PUFFER.

Apparatus for Cooling Soda Water and other Liquids.

No. 9,465. Reissued Nov. 16, 1880.

*Witnesses.*
*George Dustan*
*H. B. Lodge*

*Inventor.*
*Alvin D. Puffer.*
*F. Curtis. Atty.*

N. PETERS, PHOTO-LITHOGRAPHER, WASHINGTON, D. C.

UNITED STATES PATENT OFFICE.

ALVIN D. PUFFER, OF BOSTON, MASSACHUSETTS.

APPARATUS FOR COOLING SODA-WATER AND OTHER LIQUIDS.

SPECIFICATION forming part of Reissued Letters Patent No. 9,465, dated November 16, 1880.

Original No. 109,942, dated December 6, 1870. Application for reissue filed October 4, 1880.

*To all whom it may concern:*

Be it known that I, ALVIN DAVID PUFFER, of Boston, in the county of Suffolk and Commonwealth of Massachusetts, have made an invention of certain new and useful Improvements in Apparatus for Refrigerating Liquids; and I do hereby declare the following to be a full, clear, and exact description thereof, due reference being had to the accompanying drawings, making part of this specification, and in which—

Figure 1:
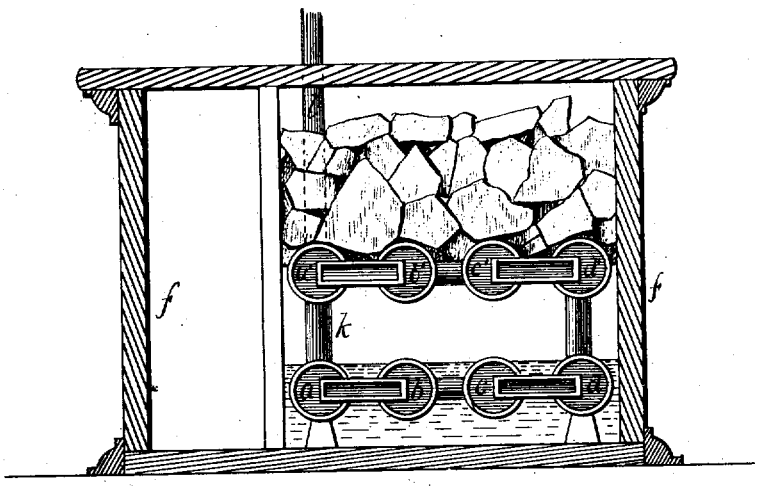
Figure 2:
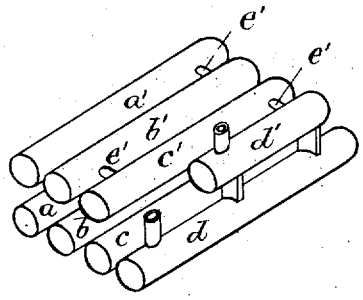

Figure 1 is vertical section of an apparatus for carrying out my invention as contained within the refrigerating-chamber of a soda-fountain. Fig. 2 is a perspective view of such apparatus.

This invention relates to means for economizing the waste of ice used in cooling liquids; and it consists, primarily, in conducting the liquid to be refrigerated through a preliminary or auxiliary series or coil of pipes or cylinders, chambers, or vessels situated within the ice-water which accumulates from the melting of the ice with which the primary cylinders or coolers are packed, or otherwise taking advantage of the low degree of temperature of such ice-water to reduce the temperature of the soda-water or other liquid previous to its entering the primary coolers which receive cold directly from the ice.

The drawings herewith presented, and which illustrate one method or means of carrying out the principle which characterizes my invention, represents, at *a b c d*, a cluster of closed cylinders, arranged, preferably, in a horizontal plane, and being each connected and communicating with its neighbor by a pipe, *e*, which unites the two diagonally-opposite ends of every two adjacent cylinders, these pipes extending a short distance into the cylinder, and otherwise formed and operating as exhibited in Letters Patent of the United States numbered 39,587, and issued to me on the 18th day of August, 1863, for improved soda-water cooler. Above these cylinders *a b c d*, which I term the "wet" or "preliminary" coolers, I dispose a second series of similarly formed and furnished cylinders, which are shown at *a′ b′ c′ d′*, the branch pipes uniting them being shown at *e′ e′*, and the two series of cylinders being united by a connecting-pipe, *g*.

The induction-pipe, by which the liquid enters the lower cooler, is shown at *k*, and the eduction-pipe, by which such liquid escapes from the uppermost coolers, is shown at *l*.

The outline of the refrigerating-chamber of the fountain in which these clusters of cylinders are situated is shown at *f*, the disposition of these cylinders with respect to the waste-water outlet being such that the lower or preliminary series may be partially or quite immersed in the water which accumulates from the melting of the ice which surrounds the upper coolers.

It is not necessary that the preliminary cylinders or coolers, whether a series of parallel straight cylinders, as shown in the drawings, or a worm, or coil, or irregular group of pipe, should be placed in the same chamber with the primary coolers, as they may be disposed in another portion of the fountain, or in a distinct vessel to which the ice-water is suffered to flow; but the two series, wherever placed, must be in free communication with each other, in order that liquid may freely course through both.

As the tendency of the droppings from the ice is to constantly reduce the temperature of the water accumulating from them in the tank below, in which the preliminary coolers are immersed, and as the tendency of the liquid entering and passing through these coolers is to raise the temperature of this water, it results that an equilibrium of temperature is secured and maintained upon such liquid of a much lower degree than that possessed by it when entering the preliminary coolers, without wasting the ice or losing its effects.

By arranging the two series of coolers one above the other, as explained, I obtain an intervening cold-air space or area, A, which aids in a great degree the reduction of the temperature of the liquid in the coolers.

The general temperature of the liquid upon entering the preliminary coolers may be set at about 60° Fahrenheit, and upon finally leaving the fountain at 35°, thus leaving 25° of cold to be obtained by the direct action of ice under the present system of refrigerating liquids.

I have found, by practical experiment, that the effect of the ice-cold water in which the preliminary coil or cluster of coolers is immersed reduces the temperature of the liquid to be refrigerated 15°, or approximately so, thus leaving but 10° of cold to be obtained directly by the ice upon the primary or upper coolers. I thus economize the waste of the ice to an extent directly equal to the difference of 15° of cold obtained by the ice-water, or twenty-five per cent.

Although, as before remarked, I have represented in the annexed drawings a series of straight parallel cylinders or coolers united by a number of pipes, I shall probably employ two or more convolute or spiral coils or worms, as being better adapted to perform the work, and less expensive than the former.

I claim—

1. An apparatus for cooling liquids in which the liquid to be cooled is first conducted through pipes immersed in the ice-water accumulating from the ice-meltings before entering the pipes cooled directly by the ice, substantially as herein shown and described.

2. An apparatus for refrigerating liquids, composed of two clusters or coils of cylinders or pipes, one of which receives a reduction of temperature directly from the ice, and the other from the ice-water which results from the melting of said ice, in the manner and operating substantially as herein explained.

3. The cold-air space or area A between the pairs or series of coolers, acting to aid the reduction of temperature of the liquid in the coolers, substantially as explained.

A. D. PUFFER.

Witnesses:
H. E. LODGE,
GEORGE DUSTAN.